Nov. 28, 1944.        R. C. LAWLOR        2,363,600
AVIGATION SYSTEM
Filed Nov. 16, 1940        2 Sheets-Sheet 1

INVENTOR
Reed C. Lawlor

Nov. 28, 1944.    R. C. LAWLOR    2,363,600
AVIGATION SYSTEM
Filed Nov. 16, 1940    2 Sheets—Sheet 2
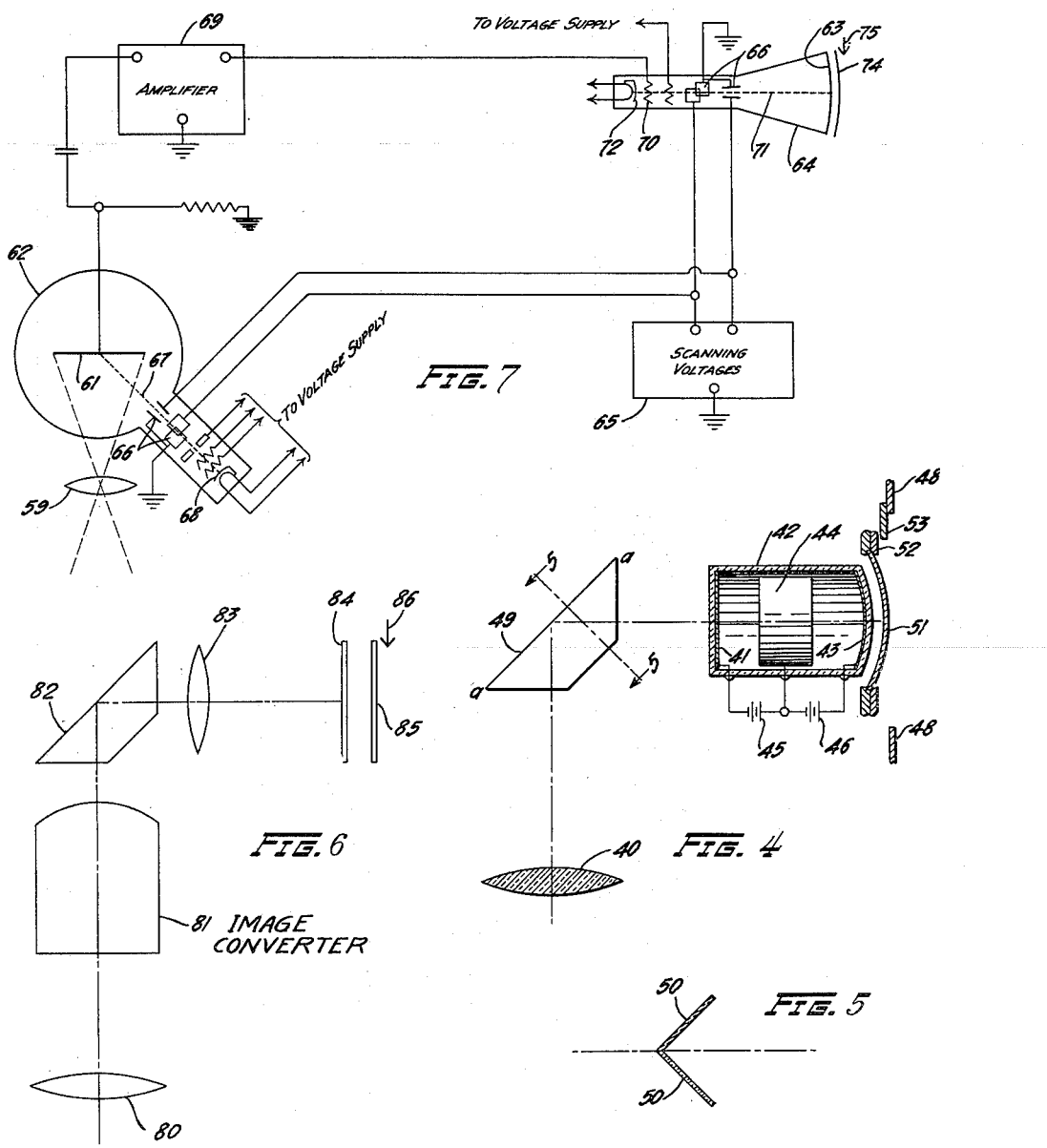
INVENTOR
Reed C. Lawlor

Patented Nov. 28, 1944

2,363,600

UNITED STATES PATENT OFFICE 2,363,600

AVIGATION SYSTEM

Reed C. Lawlor, Pasadena, Calif.

Application November 16, 1940, Serial No. 365,981

15 Claims. (Cl. 33—46.5)

My invention pertains to navigation and, in particular, pertains to a system of avigation for determining drift of an aircraft in flight.

In prior art methods of determining drift, objects on the ground have been brought to focus in an image area on a screen or a piece of frosted glass, and the direction that image points of prominent earth objects travel across said area has been utilized to measure the drift of the aircraft. Such prior methods of avigation suffer from two principal disadvantages. In the first place, measurement of drift in such systems depends for its success upon good visibility of the ground, and, secondly, in such systems the observer must devote his full attention to the measurement for a relatively long period, during which time his attention to his other duties, such as the piloting of the aircraft, is greatly impaired. Furthermore, such systems are difficult to install in large aircraft because of the difficulty in bringing the image to a suitable position on the instrument panel.

The principal object of my invention is to overcome the inconveniences and other limitations of such prior systems of determining drift of aircraft.

Another object of my invention is to provide an avigational instrument from which drift may be determined with great rapidity and ease.

Another object of my invention is to provide a system for determining drift even in foggy or cloudy weather.

Another object is to provide an electrical system based on television principles, which may be readily utilized in the study of ground motion.

Still another object of my invention is to provide a drift indicator which may be mounted directly on the instrument panel of an aircraft in such a position that it may be readily viewed by the pilot of an aircraft.

A further object of my invention is to provide a system for determining the sense as well as the direction of travel with respect to the ground.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

In general, to determine drift of an aircraft, I form a visible image of the terrain over which an aircraft is flying by translating a radiant image of earth objects, preferably an infra-red, or an ultra-violet image, into a visible fluorescent image, and observe the motion of visible image points of the earth objects across the fluorescing image field. In the preferred form of my invention, I form a persistent but yet fugitive visible fluorescent image of the terrain over which an aircraft is traveling and measure the direction that the streaked images of earth objects form in the image area relative to a datum line to determine the angle between the longitudinal axis of the aircraft and hence the direction of flight of said aircraft over the surface of the earth.

In this specification I use the term "persistent fluorescence" to signify any fluorescent phenomenon which continues after the primary stimulating radiation is removed and I apply the term "fugitive" to such persistent fluorescence to emphasize the fact that the persistent fluorescent images utilized in my system are of an impermanent character lasting for only a short time, such as a few seconds to a few minutes.

My invention may be more readily understood by reference to the following description taken in conjunction with the accompanying drawings, wherein:

Fig. 4 is a view, partly schematic and partly in section, of a preferred form of my navigational instrument suitable for mounting on the instrument panel of an aircraft.

Fig. 5 is a sectional schematic view of an image inverting reflector taken on the line 5—5 of Fig. 4.

Fig. 6 is a schematic view of a form of my invention similar to Fig. 4 but utilizing an image erecting system to facilitate measurement of direction of travel.

Fig. 7 is a schematic diagram of another form of my invention utilizing television principles.

Figure 2:
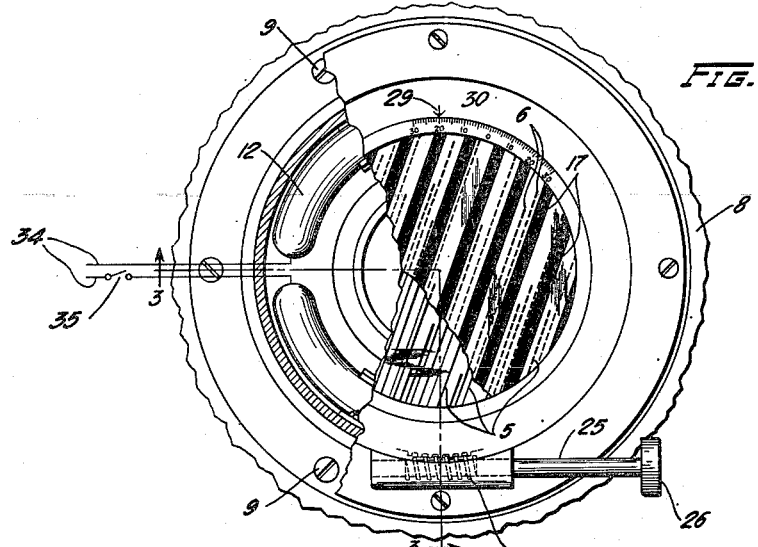
Fig. 2 is a plan view, partly in section and partly schematic, of a preferred form of my drift indicator with the instrument face removed.
Figure 3:
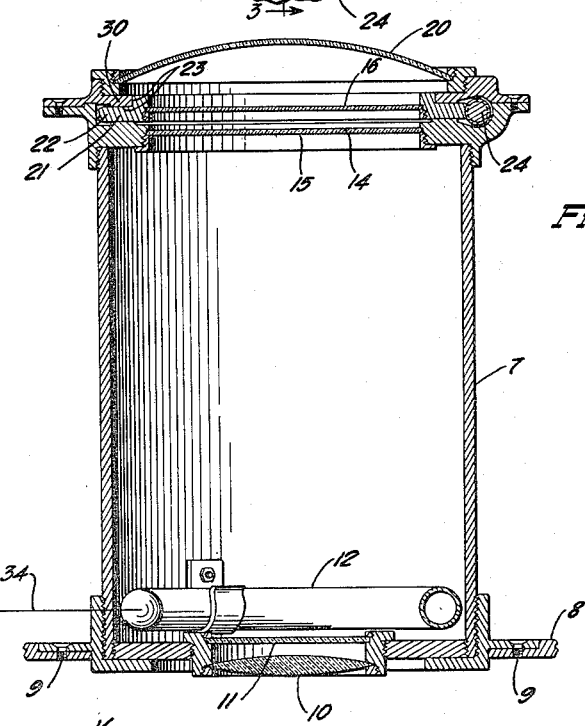
Fig. 3 is a vertical sectional view, partly schematic, of a preferred form of my drift indicator taken on the line 3—3 of Fig. 2.
Figure 1:
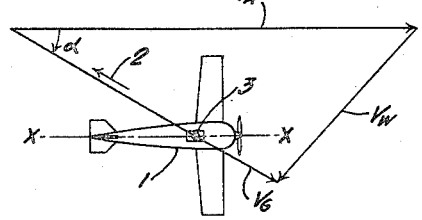
Fig. 1 is a schematic diagram utilized in explaining drift and the vector relations between air speed, wind velocity, and ground velocity.

Referring directly to Fig. 1, I have shown an aircraft I in the floor of which is mounted a drift indicator 3 of the type illustrated in Figs. 2 and 3. The vector diagram shown in Fig. 1 illustrates schematically the manner in which the velocity of the aircraft I with respect to the air $V_A$ and wind velocity $V_W$ combine to produce a still different velocity of the aircraft with respect to ground $V_G$. In general, as a result of the combined action of the wind velocity $V_W$ and the velocity $V_A$ of the aircraft with respect to the air, the ground speed differs from the air speed, and the direction of travel of the aircraft with respect to ground deviates from the longitudinal axis $x$—$x$ of the aircraft by an angle $\alpha$ known as the drift angle. To an observer looking vertically downward from the aircraft, objects on the ground appear to travel in the direction of the arrow 2, having the same direction as the ground velocity $V_G$ but in the opposite sense.

According to one form of my invention I form a persistent fluorescent image of the earth on a viewing screen of the drift indicator 3 positioned in the floor of the aircraft 1. Because of the persistence of fluorescence of the materials which I prefer to utilize in my invention, each object on the ground which is focused as an image point on said fluorescent screen forms a lineal image or streaked line parallel to said arrow 2 while the aircraft 1 is in flight. Portions of such a streaked image are indicated by the lines 5 shown in the field of view of Fig. 2. Each outstanding image point leaves a streaked trail behind it as the image point indicated by the heads 6 progresses across the image field.

Preferably the fluorescent material which I utilize in the viewing screen of my instrument has a decay characteristic such that each image point forms a readily perceptible streak which extends at least half way across the fluorescent image area. The time decay characteristic most suitable for this purpose depends in part upon the normal altitude range in which the instrument is to be used. Preferably the material selected should be such that the apparent visibility of an image point varies by a factor of about five or ten across the image field, thus providing for distinguishing between portions of newly formed streaks and streaks of decaying strength in the background. Fluorescent materials of widely varying time decay characteristics are well known in the art and need not be specifically described here.

In Figs. 2 and 3, I have shown details of a simple form of my drift indicator utilizing long wavelength radiation from earth objects. Said indicator comprises a cylindrical housing or tube 7, held in place in the floor 8 of an aircraft by means of screws 9—9. An objective lens 10 smaller in diameter than the tube and having a normally vertical optic axis is mounted at the bottom end of said tube 7. A filter 11 adapted to pass only infra-red rays is mounted above said lens 10 in any suitable manner. Around and above said lens 10 and filter 11 is mounted an ultra-violet ray tube 12. At the uppermost end of said cylinder 7 there is mounted a first glass disc 14 having a viewing screen 15 in the form of a fluorescent coating positioned on the lower side thereof, preferably in coincidence with the focal plane of said lens 10 to produce sharp lines. Above said first glass disc 14 is rotatably mounted a second glass disc 16 having opaque lubber lines 17 on one side thereof, preferably on the lower side to reduce parallax to a small amount. At the very top of said housing 7 is mounted a glass cover plate 20 providing an instrument face, which serves to keep dust, etc., out of the instrument.

Said rotatable disc 16 having lubber lines thereis secured to an annular ring 21 having a worm gear 22 on the outer edge thereof and rigidly secured thereto. Said ring is rotatably confined at the side, top, and bottom thereof by means of bearings surfaces 23. The direction that said lubber lines 17 form with the axis $x$—$x$ of the aircraft 1 may be varied by rotation of a high pitch worm 24. Said worm is mounted on a horizontal shaft 25 passing tangentially through the rear side of said housing 7 at the upper end thereof at a point of the circumference of said housing directly in front of the navigator. Said shaft has a manually operable knob 26 on the outside end thereof for rotational adjustment of said lubber lines 17. An index mark 29 is provided on a collar 30 fixed to said tube 7 in any convenient manner. Preferably the index mark 29 lies on a diameter of said collar 30 parallel to the longitudinal axis $x$—$x$ of the aircraft.

Said rotatable annular ring 21 on which is mounted the lubber line disc 16 is indexed in degrees on the portion of the uppermost surface thereof which passes adjacent said index 29. When said lubber lines are parallel to the longitudinal axis $x$—$x$ of the aircraft, the zero drift angle reading is directly in line with said index mark.

Current is supplied to said ultra-violet ray tube 12 through a cable 34 from a suitable power supply (not shown). This current may be applied momentarily, if desired for purposes to be hereinafter explained, by manually closing key 35 in series with one side of said cable; or current may be automatically applied intermittently to said ultra-violet ray tube in any convenient manner for purposes which will become evident hereinbelow.

In one particular embodiment of my invention, I utilize the quenching effect of infra-red rays on the fluorescence of certain phosphors in order to determine the drift of an aircraft in which my instrument is mounted. Materials exhibiting this property to a marked degree are well known in the art and comprise, for example, many zinc sulfide phosphors. In this form of my invention illustrated in Fig. 3, such a phosphor is incorporated in said fluorescent screen 15, and an ultra-violet light 12 directs ultra-violet rays upon said fluorescent screen 15 in such a manner that the ultra-violet radiation is fairly evenly distributed over said screen and an infrared image of a portion of the earth is focused upon said screen by means of lens 10 and suitable filter 11. By virtue of the fact that the intensity of fluorescence is diminished at points where infra-red light falls upon said coating 15, a negative image of the terrain over which the craft is flying will be formed thereon. The movement of dark image points across said screen may be observed and measured to determine the velocity of the aircraft. In this form of my invention the image points traversing the screen leave dark trails or streaks 5 behind them. The angle said trails or streaks form with the longitudinal axis of the ship on this image screen is the drift angle $\alpha$.

Many materials are known to exhibit an acceleration in fluorescence decay rate when exposed to infra-red radiation following exposure to ultra-violet. I utilize such materials as coating 15 in another preferred form of my invention, in which I close key 35, exposing a fluorescent screen of such material to radiation from an ultra-violet source 12 for a short interval of time, in order to bring the intensity of fluorescence of said screen up to a maximum, and open the key to shut off the ultra-violet radiation. During the time when the fluorescence of said screen is decaying, lines or streaks are formed on said screen where said screen is traversed by infra-red image points of earth objects. To measure drift I simply measure the angle $\alpha$ that such streaks make with the longitudinal axis of the ship 1.

In order to make accurate drift angle measurements, I prefer to adjust the position of lubber lines 17 parallel to the streaks 16 on said fluorescent image screen as shown in the central field of view of Fig. 2.

It is clear, of course, that the above described form of my invention may often be utilized for determining drift even under unfavorable weather conditions, because of the fact that infra-red radiation, at least partially, penetrates fog and clouds, especially when such fog and clouds have been but newly formed and consist in but small particles of water vapor.

In case the aircraft is to be used only in daylight when the visibility is good, the ultra-violet light source 12 and the infra-red filter 11 may be dispensed with and short wave length radiation in the range comprising, say, ultra-violet, violet, and blue light, focused through a quartz lens on a persistently fluorescent screen. If the material of said screen obeys Stoke's law (as almost all fluorescent materials do), said short wave length radiation will be converted into longer wave length radiation in the range comprising, say, green, yellow, and red light. By providing the instrument with a lens 10 (or lens 10 and filter 11) which transmits only such short wave length radiation, and at the same time providing a long wave length filter between the screen 15 and the observer's eye, only light of the streaked fluorescent image will reach the observer. Discs 14 and/or 16 and/or cover plate 20 may comprise the long wave length filter. Thus, by providing a system with complementary light filters with a short wave-length filter on the object side and a long wave-length filter on the viewing side of the fluorescent screen 15, the only image seen on said screen comprises a fluorescent image of the earth. If such screen is of the persistent fluorescent type, streaks formed thereon will indicate the direction of flight.

To improve the visibility of such an image, a viewing hood or light-shield (not shown) may be attached to the uppermost end of said instrument tube 7.

A second general form of my invention is illustrated schematically in Fig. 4. In this embodiment of my invention, I focus radiant energy images of the earth objects, preferably infra-red images, by means of a lens 40, on a photo-cathode 41 of an image converter 42. Electrons emitted at various points of said photo-cathode 41 in prportion to the intensity of the light incident thereon are focused on a fluorescent anode 43 by virtue of the electron focusing properties of an electron lens formed by a cylindrical electrode 44 positioned coaxially between said photo-cathode 41 and said fluorescent anode 43. Th focusing properties of such an image converter 42 and the intensity of the image formed are determined, in part, by the geometry of the system and the potentials of batteries 45 and 46. The intensity of the fluorescent image may, in general, be increased by increasing said potentials proportionally.

In the particular embodiment here shown, the optic axis of the objective lens 40 is mounted in such a position as to be vertical in normal flight, while the axis of the image converter is substantially horizontal, readily permitting mounting the fluorescent viewing screen substantially parallel to the surface of an aircraft instrument panel 48—48.

The reflecting means 49 which I prefer to utilize in order to direct the optical image onto said photocathode may comprise a roof angle, or Amici, prism but preferably comprises two lightweight front-surface mirrors 50—50 forming a dihedral angle of ninety degrees, as shown in Fig. 5, with the line of intersection a—a positioned in such a maner as to reflect the earth image onto the normally vertical photo-cathode 41. By utilizing in fluorescent anode 43 a material in which the fluorescence is relatively persistent, streaked images of earth objects are formed on said anode. The angle that said streaks make with the normal or vertical axis of the aircraft 1 is the drift angle $\alpha$. This angle may be readily measured by rotating, in any convenient manner, lubber lines on a disc 51 into a position parallel to said streaks. The drift angle may be read from angular divisions marked on a collar 52 beneath a convenient index 53 mounted in fixed relation to the instrument panel 48—48. In this form of my invention, I prefer to utilize a lubber line disc 51 which is of substantially the same shape as the anode end of the image converter 42. In the form of image converter 42 shown here, I utilize a flat photo-cathode 41 and a spherical fluorescent anode 43 and thus simplify the optical problem without a sacrifice of accuracy in making drift determinations.

In view of the explanation of my invention hereinabove given, it will be clear to those skilled in the art that when I utilize infra-red radiation from earth objects, the determination of drift angle is possible even under unfavorable weather conditions in which the ground visibility is somewhat impaired. Other suitable ranges of radiation may be utilized when the ground visibility is good.

By utilizing an image inverter 49 for reflecting the optical image onto the photo-cathode, I am able to produce on the fluorescent screen a streaked image of the earth in which the direction made by the streaks on the screen as viewed by a pilot looking toward the instrument panel 48 lies in the same direction in the field of view, as objects on the earth would appear to be moving, if the pilot looked directly downward at the ground beneath him while remaining seated in his normal forward-looking position. Thus the image inverter 49 simplifies the interpretation of the drift indications.

In view of the above teachings, it is clear, of course, that this type of image inverter may be utilized between the lens 10 and the fluorescent screen 15 of Fig. 3, if it is desired to mount the screen of Fig. 3 on an instrument panel 48 while maintaining the lens in its floor position. It will also be clear to those skilled in the art that the same results may be obtained by positioning the image converter 42 of Fig. 4 directly above the objective lens 40 and viewing the fluorescent anode image through an aperture in the instrument panel 48 by rays reflected from an image inverter 49. Such a system is illustrated in Fig. 6 described below.

It will be clear to those skilled in the art that other variations may be made in the arrangement of parts without departing from the spirit or scope of my invention. The essential characteristic of this form of my invention is that the axis of the objective aperture or the axis of the bundle of collected rays be vertical in normal flight while the axis of view be substantially normal to the instrument panel, while provision is made for giving the streaks a natural appearing position in the field of view.

Fig. 6 schematically illustrates a modified form of Fig. 4, utilizing an objective lens 80, an image converter 81, an image inverting reflector 82, an erecting lens 83, a viewing screen 84 comprising, say, frosted glass, a lubber line disc 85, and an index 86. The advantage of this modification of my invention lies in the fact that if a fleetingly persistent material is used for the fluorescent screen, objects are disposed in the image of the earth's surface focused on the viewing screen on the instrument panel in the same relation to each other as they would appear to a pilot looking directly downward at the earth in his normal sitting position. When using a fleetingly persistent fluorescent screen in conjunction with this optical system, streaks corresponding to different earth objects indicate direction of drift, with the bright ends of the streaks clearly indicating the actual sense of the motion of the aircraft with respect to prominent earth objects. In the system of Fig. 6 the image points appear to move in a general downward direction across the field of view, thus simulating the natural view of a pilot watching ground objects through the floor at his feet.

In Fig. 7, I have illustrated schematically a further embodiment of my invention utilizing television principles for achieving even greater flexibility. In general, this embodiment of my invention utilizes a television pickup device and a television reproducing device coupled by an appropriate amplifier and a common scanning control system. The pick-up device is positioned to collect radiation from earth objects over a cone-shaped space having a normally vertical axis when the aircraft is in normal flight, and the reproducer is positioned on the instrument panel in such a manner as to facilitate ready viewing for an observer sitting erect in the cockpit.

In one form of this system, as shown in Fig. 7 an image of the earth's surface is formed by collecting lens 59 on the mosaic photo-sensitive screen 61 of an iconoscope tube 62. Where radiation falls upon said mosaic screen 61, electrons are emitted in accordance with the total quantity of radiation incident thereon and a corresponding electron image is formed on the mosaic. I translate this electron image into a visible fluorescent image on an anode 63 of the associated cathode ray tube 64, preferably mounted on the instrument panel. In order to achieve this result, I utilize a common source 65 of scanning voltages for corresponding pairs of horizontal and vertical deflecting plates 66 of the iconoscope and the cathode ray tubes.

During the operation of this system, an electron beam 67 formed at the cathode 68 of said iconoscope tube completely scans elements of said mosaic screen 61 in rapid succession, thereby repeatedly applying corresponding elemental signals to the input of amplifier 69. The output of said amplifier is applied to the control grid 70 of cathode ray tube 64, the voltage of which grid modulates the intensity of an electron beam 71 originating at cathode 72 and directed onto the fluorescent screen of said cathode ray tube 64.

By utilizing a common source 65 of scanning voltages for the corresponding pairs of deflecting plates 66 of the iconoscope and cathode ray tubes 62 and 64, the relative positions of the electron beams 67 and 71 in the two tubes always correspond, thereby bringing about the formation of a visible image on the fluorescent screen of said cathode ray tube 64 corresponding identically with the electron image of the earth formed on the mosaic 61 of said iconoscope tube 62. For best results and easiest interpretation, scanning voltages of frame frequency are applied to the plates of the iconoscope tube which move the electron beam 67 parallel to the longitudinal axis of the craft and the vertical sweep deflecting plates of the cathode ray tube 64. Scanning voltages of line frequency are applied to the horizontal deflecting plates of the iconoscope and cathode ray tube. Thus the electron beams sweep across the mosaic and fluorescent screens perpendicular to the directions of zero drift. In this way the scanning lines always form an angle with the drift lines.

No detailed description of the amplifier 69, scanning voltage source 65, or the system for supplying voltages to the various electrodes of the iconoscope tube 62 and the cathode ray tube 64 are given here since the details of such circuits and connections are well known to those skilled in the art.

By utilizing a fluorescent material of slow decay characteristics on the screen of said cathode ray tube 64, the succession of earth images formed thereon will produce a streaked image, from which indications of drift may be readily obtained by the methods hereinabove described. In view of the fact that streaked images are of value for my purpose, I may utilize relatively low frequency sweep circuits in my scanning system 65 instead of the rapid frequency sweep circuits essential to successful television operation. By appropriately connecting the deflecting plates 66 of the iconoscope tube 62 and the cathode ray tube 64, image points may be made to move naturally across the viewing screen as in other systems hereinabove described. For a given optical arrangement there is only one such appropriate set of connections.

This form of my invention utilizing television principles is useful, not only under adverse weather conditions, but by virtue of the fact that large signal gain may be obtained in amplifier 69, it may also be utilized even at night when only small amounts of infra-red radiation are being emitted from objects on the earth. Objects which exhibit infra-red radiation at night include, for example, many plants which phosphoresce infra-red long after sunset. Special infra-red sources (not shown) may be positioned on the surface of the earth to aid night navigation.

If it is desired to use a low gain amplifier 69, electron optical image intensifiers may be incorporated in either the iconoscope tube 62 or the cathode ray tube 63.

It will, of course, be clear to those skilled in the art that electron multiplier systems may also be utilized in adapting the principles of television to my invention.

The above described form of my invention illustrated in Fig. 7 may be utilized to determine drift by utilizing a lubber line and angle measuring system 74 and 75 such as that hereinabove described in connection with Figs. 2, 4, and 6.

From the above description of various forms of my invention it is evident that by forming persistent fluorescent images of prominent earth objects I can measure drift angle accurately, rapidly, and conveniently, and that such measurements may be facilitated by utilizing for my screens phosphors which exhibit fugitive, though persistent, fluoroscent characteristics.

I claim:

1. A drift indicator for aircraft comprising a lens mounted with its optic axis in a normally vertical line in the body of said aircraft, an image screen posesssing fluorescent properties mounted in a substantially normally vertical plane of said aircraft, means cooperating with the lens for producing on said image screen a visible fluorescent image of earth objects passing beneath said craft when in flight, and means for measuring the angle an image point of an object travels across said image screen with reference to a datum line fixed on the craft.

2. A drift indicator as in claim 1 wherein said first means includes light deflecting means comprising an image inverter.

3. An avigation instrument for an aircraft comprising an optic lens mounted on the aircraft with its optic axis substantially vertical in normal flight, means for translating the optic image formed by said lens into a corresponding secondary image in which points of earth objects appear as lines of gradually diminishing visibility, and means for measuring the angle formed by the lines relative to a datum line.

4. An avigation instrument in accordance with claim 3 wherein said translating means comprises a photoelectric surface in the image plane of said optic lens and means for translating an electron image of the earth formed on said photoelectric surface into a corresponding fluorescent secondary image.

5. An avigation instrument for an aircraft, comprising an optic system including a focusing instrument, said system being mounted with the optic axis of its entrance aperture in a normally vertical line in said craft, a fluorescent screen responsive to radiant energy collected by said element, the screen being formed of a material having such a characteristic that points of earth objects traversing the screen form lines thereon of gradually diminishing visibility, and means for measuring the direction of a line traced on said screen by a moving image point formed thereon with reference to a datum line fixed to the craft.

6. An avigation instrument for an aircraft in flight comprising a television pick-up device positioned in said aircraft to collect radiant energy from earth objects from a cone-shaped space having a normally vertical axis when said aircraft is in flight, a television reproducing device having a fluorescent viewing screen, common scanning means synchronously coupling said pick-up device and said reproducing device in such a manner as to provide a simple one-to-one relation between elemental areas in said viewing screen and elemental areas in the object space of said pick-up device, and means for transferring energy from elemental areas of said pick-up device to said viewing screen in such a manner that points in the object space appear as lines of gradually diminishing intensity on the screen, and means for measuring the angle formed by the lines relative to a datum line.

7. In a drift indicator for aircraft, means for converting radiation from an object point on the earth over which an aircraft is flying into an image line comprising successively formed image points of diminishing intensity, and means for measuring the angle that the image line deviates from a datum line fixed in the image plane.

8. In a drift indicator for aircraft, means for producing in an image area superposed streaked images of portions of the earth successively traversed by an aircraft in flight, each image being of diminishing intensity, and means for measuring the angle formed between some of the streaks and a datum line in the image area.

9. In an aircraft instrument, an image screen, means for forming on the screen an image of a portion of the earth over which a craft is flying, means for converting object points into image streaks of decaying intensity, and means for simultaneously determining the direction formed by the streaks relative to a datum line.

10. In a navigation instrument, the improvement which comprises means for forming an electron image of a portion of the earth over which an aircraft may be flying, means for converting said electron image into a corresponding fluorescent image comprising at least one line of gradually diminishing intensity and corresponding to an object point on the earth, and means for measuring the angle between such a line and a datum line.

11. In a navigation instrument having means for forming a radiant energy image of the terrain traversed by an aircraft in flight, the improvement which comprises means for translating said radiant energy image into a secondary image in which a point of said terrain occurs as a series of aligned image points of gradually diminishing intensity, and means for simultaneously indicating the direction formed by the line of image points relative to a datum line.

12. In a drift indicator adapted for mounting on an aircraft, means for forming an optical image of a portion of the earth over which an aircraft may be flying, said image comprising radiant energy from the infra-red region, an image screen formed of a phosphorescent material, the phosphorescence of said screen being quenchable by infra-red radiation incident thereon, exciting means for intermittently causing the screen to phosphoresce substantially uniformly, and means for measuring the relative position of aligned points successively darkened on said screen by an image containing such radiant energy.

13. In a drift indicator adapted for mounting on an aircraft, an image screen formed of a material which phosphoresces visibly for a period of about a few seconds to a few minutes when excited by short wave-length radiation, means for forming on the screen an optical image of a portion of the earth over which an aircraft may be flying, said image comprising such short wave-length radiation, and means for measuring the relative position of aligned points successively exposed on said screen to the same part of said image.

14. In a navigation instrument for an aircraft, an optic system for mounting with the optic axis of its entrance aperture normally extending downwardly in the craft, a fluorescent screen responsive to radiant energy collected by said optic system, the screen being formed of a material having such a characteristic that image points traversing the screen form lines thereon of gradually diminishing intensity, and means for measuring the direction of a line traced on said screen by an image point moving thereacross with reference to a datum line.

15. In an instrument for navigation of a craft having a screen, the improvement which comprises means for forming on said screen a series of aligned and simultaneously but only temporarily detectable image points, each said image point representing the same part of an object with respect to which said craft is moving, and means for measuring the direction formed by the line of said image points relative to a datum line.

REED C. LAWLOR.